US008762548B1

(12) United States Patent
Kessel et al.

(10) Patent No.: US 8,762,548 B1
(45) Date of Patent: *Jun. 24, 2014

(54) WIRELESS NETWORKING SELECTION TECHNIQUES

(75) Inventors: Steven Kessel, Seattle, WA (US); Felix F. Antony, Issaquah, WA (US); Laurent E. Sellier, San Francisco, CA (US); Hugh Finnan, Seattle, WA (US); Gregory M. Hart, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 817 days.

This patent is subject to a terminal disclaimer.

(21) Appl. No.: 12/943,235

(22) Filed: Nov. 10, 2010

(51) Int. Cl.
*G06F 15/16* (2006.01)

(52) U.S. Cl.
USPC ............................ 709/228; 709/219; 709/225

(58) Field of Classification Search
USPC .......... 709/217, 219, 223, 225, 227, 228, 229
See application file for complete search history.

(56) References Cited

U.S. PATENT DOCUMENTS

| | | | |
|---|---|---|---|
| 6,882,648 B2 | 4/2005 | Kobayashi | |
| 7,444,158 B2 | 10/2008 | Shitama et al. | |
| 7,769,887 B1 | 8/2010 | Bhattacharyya et al. | |
| 8,169,935 B2 | 5/2012 | Taaghol et al. | |
| 2005/0050318 A1 | 3/2005 | Alone et al. | |
| 2006/0084417 A1* | 4/2006 | Melpignano et al. | 455/418 |
| 2006/0094400 A1* | 5/2006 | Beachem et al. | 455/410 |
| 2010/0322124 A1 | 12/2010 | Luoma et al. | |

OTHER PUBLICATIONS

Office action for U.S. Appl. No. 12/881,487, mailed on Nov. 26, 2012, Rachabathuni et al., "Wireless Networking Techniques", 7 pages.
Office action for U.S. Appl. No. 12/881,487, mailed on Mar. 14, 2013, Rachabathuni et al., "Wireless Networking Techniques", 8 pages.
Non-Final Office Action for U.S. Appl. No. 12/881,487, mailed on Sailesh Rachabathuni et al., "Wireless Networking Techniques", 8 pages.

* cited by examiner

*Primary Examiner* — Viet Vu
(74) *Attorney, Agent, or Firm* — Lee & Hayes, PLLC (57) ABSTRACT

Electronic devices may find and test wireless networks present at a location, and may display available networks to a user for selection and use. The finding and testing may vary based upon the location of the device, including such factors as previously determined networks for the area, time at the location, and so forth.

21 Claims, 11 Drawing Sheets

WIRELESS NETWORKING SELECTION TECHNIQUES

BACKGROUND

Electronic devices, such as electronic book reader devices ("eBook reader devices"), cellular telephones, portable media players, desktop computers, laptops, tablet computers, netbooks, personal digital assistants, and the like, may use wireless networks to access network resources. Traditionally the determination, selection, and configuration of wireless networks for use by electronic devices have been inconvenient and prone to error.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Electronic devices may rely upon network connections for communication to retrieve content, interact with remote servers, and so forth. These network connections may be wired or wireless. Wireless communication may extend from a wireless local area network (WLAN), such as WiFi, to wireless metropolitan area networks (WMAN), such as WiMax, to wireless wide area networks (WWAN), such as 3G and 4G cellular systems.

At a given location, many networks may be available. For example, while sitting in a downtown restaurant, a user may be within usable range of several WLANs, a WMAN, and several WWANs. Connecting to wireless networks may require the user to find, select and enter connectivity information into the user's device. This connectivity information may include IP configuration settings, encryption parameters and passwords, and so forth. Similarly, connecting to different wired networks may call for entry of connectivity information as well.

Such finding, selection, and entry is time consuming, prone to error, and may be inconvenient and frustrating to a user who simply wants to access network resources. Furthermore, given that this process of configuration is prone to error, the likelihood that users will request help in configuring their devices to connect to wireless networks also increases. This, in turn, increases support costs associated with the connectivity.

To further complicate the issue, the device may change access points or even networks once connected. This is particularly acute when the device is mobile and accessing short range WLANs and medium-range WMANs. However, even while in a single location, the device may change to a more favorable network which provides a better user experience, minimize cost, conserve battery power, and so forth for a given situation. Traditionally the user was faced with constantly entering connectivity information when moving into range of a new wireless network, selecting an alternative network to meet changing demands, and so forth. These actions can be frustrating to the user, and act as disincentives to the use of wireless networks.

This disclosure describes, in part, techniques for providing an efficient wireless connection experience, such as with a wireless connectivity module. This module is configured to determine a location, find wireless networks available at the location, generate a set of found wireless networks, test those wireless networks, and connect and use the found networks that are available. An available network is one which the device may connect to and use to transfer data.

Executable network plug-ins may be provided as part of the wireless protocol stack. A particular network is associated with an executable network plug-in. This executable network plug-in is configured to, when executed, configure and establish a network connection with that particular network.

In addition to the use of network plug-ins, additional testing on other located networks may take place. Testing may include determining connectabilty, attempting a domain name service (DNS) lookup, attempting retrieval of a known reference file from a server, and so forth. Networks may be categorized as open, accessible, captive, or unusable in some instances. An open network has no restrictions for connection. That is, this type of network may not request authentication from a device or user before connecting with the device. An accessible network is one which is accessible via an executable network plug-in or which has previously been configured.

In the case of a captive network, some form of connectivity is available, however some user interaction may be required. For example, a hotel WLAN which requires a user enter a room number to establish connectivity may be considered "captive." In contrast, an unusable network is unsuitable for connection by the user, such as a locked and encrypted WLAN for which the user has no valid encryption key. The unusable network may be usable to another user, such as one with an appropriate executable network plug-in or encryption key.

The wireless connectivity module may maintain data about preferred networks, which may be preferred for a given location. Where a preferred network is available at the given location, the preferred network may be used preferentially.

For example, the user may prefer to use a WWAN network rather than the local WLAN at the local public library. Thus, even if both were available, the device would connect to the preferred network, so long as it is available and not overridden by the user or by the module finding that another network is even more favorable.

The techniques described herein may be implemented by an electronic device with a processor, network interface, and external memory, such as an eBook reader device or any other type of electronic device. While this disclosure describes providing an efficient wireless experience in terms of an eBook reader device, the concepts described herein may also be applicable to other devices such as cellular telephones, portable media players, desktop computers, laptops, tablet computers, netbooks, personal digital assistants, and so forth.

Illustrative eBook Reader Device

Figure 1:
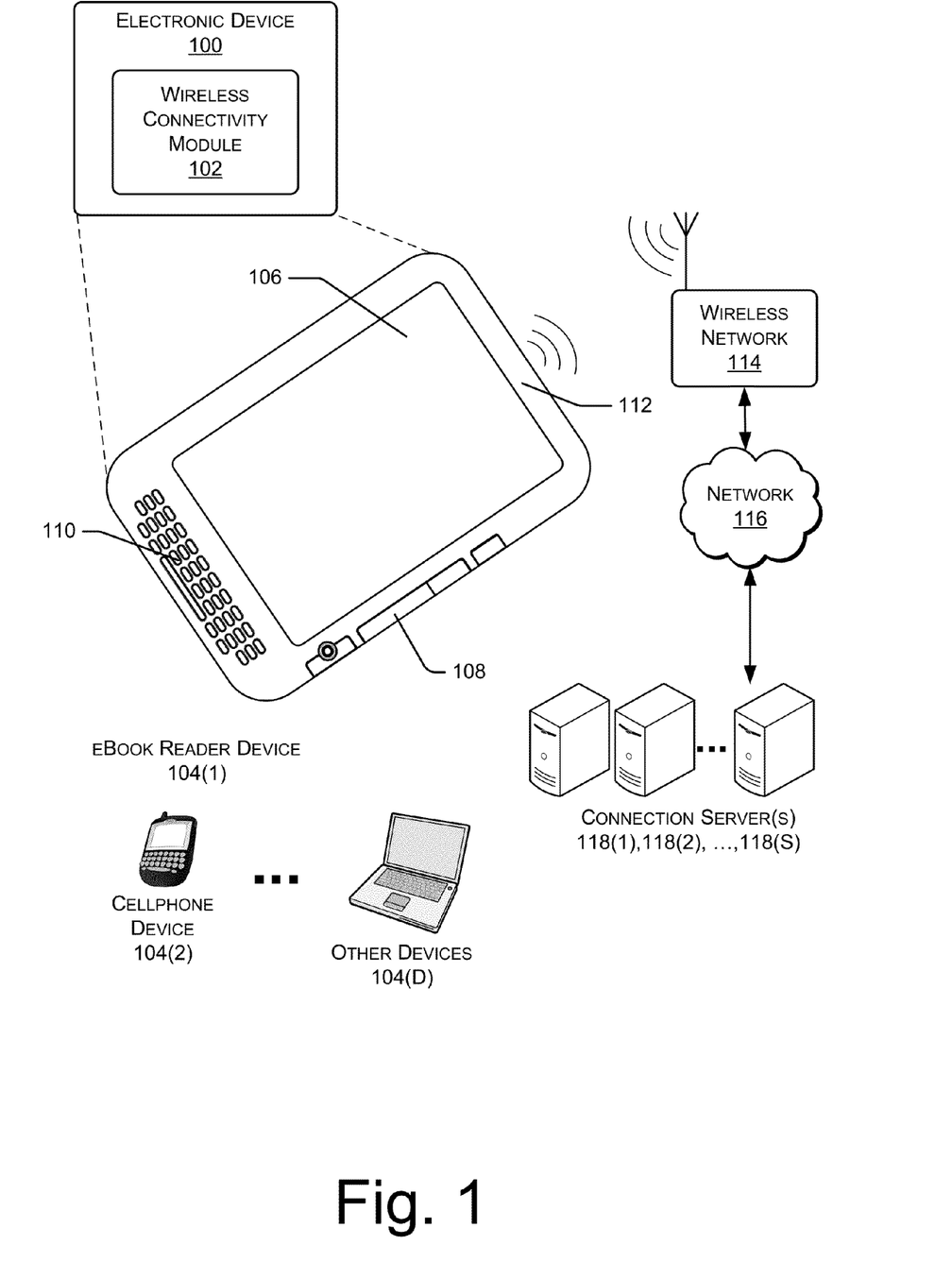
FIG. 1 is an illustrative electronic device configured with a wireless connectivity module that provides an efficient wireless connection experience to a user.

FIG. 1 is an illustrative electronic device 100 configured to provide an efficient connection experience and maintain connectivity by way of a wireless connectivity module 102. The wireless connectivity module 102 provides instructions that, when executed, provide for finding, testing, and connecting to wireless networks.

Several devices are shown in this illustration that may utilize the wireless connectivity module 102. For example, an electronic book eBook reader device 104(1) is shown embodied as a handheld, dedicated eBook reader device. FIG. 1 also illustrates that a cellphone device 104(2) and other devices 104(D), such as a netbook computer, may include and implement the wireless connectivity module 102. As used herein, letters within parenthesis such as "(D)" indicate an integer number greater than zero.

The eBook reader device 104(1) may have a display 106 to present content in a human-readable format to a user. The display 106 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

The content presented on the display 106 may take the form of electronic books or "eBooks." For example, the display 106 may depict the text of the eBooks and also any illustrations, tables, or graphic elements that might be contained in the eBooks. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 106 may further include touch screen capabilities that allow user input through contact or gesturing relative to the display. For convenience only, the display 106 is shown in a generally rectangular configuration. However, it is understood that the display 106 may be implemented in any shape, and may have any ratio of height to width. Also, for stylistic or design purposes, the display 106 may be curved or otherwise non-linearly shaped. Furthermore the display 106 may be flexible and configured to fold or roll.

The eBook reader device 104(1) may also incorporate a keypad that includes one or more actuable controls 108 and a keypad 110 for user input. The one or more actuatable controls 108 may have dedicated or assigned operations. For instance, the actuatable controls 108 may include a joystick, page turning buttons, navigational keys, a power on/off button, selection keys, touchpad, and so on. Furthermore, the keypad may include any other controls configured to receive any other sort of user input via buttons, touch screen inputs, or the like.

The eBook reader device 104(1) also incorporates a wireless networking interface 112. The wireless networking interface 112 allows for communication via a wireless network, and may support one or more wireless networking technologies. For example, the wireless networking interface 112 may support WiFi, WiMAX, 3G, 4G, and so forth. The wireless networking interface 112 may comprise one or more modems, radios, and so forth.

A wireless network 114 is shown in communication with the wireless networking interface 112 of the eBook reader device 104(1). The wireless network 114 may incorporate one or more network security devices between itself and an external network, such as network 116. The network 116 is representative of any one or combination of multiple different types of networks, such as the Internet, cable networks, cellular networks, and so forth.

One or more connection server(s) 118(1), 118(2), . . . 118(S) connect to the network 116. The connection servers 118(1)-(S) are configured to maintain executable connectivity plug-ins, maintain a store of wireless networks associated with particular locations, and other functions. The servers 118(1)-(S) may be embodied in any number of ways, including as a single server, a cluster of servers, a server farm or data center, and so forth, although other server architectures (e.g., mainframe) may also be used.

Figure 2:
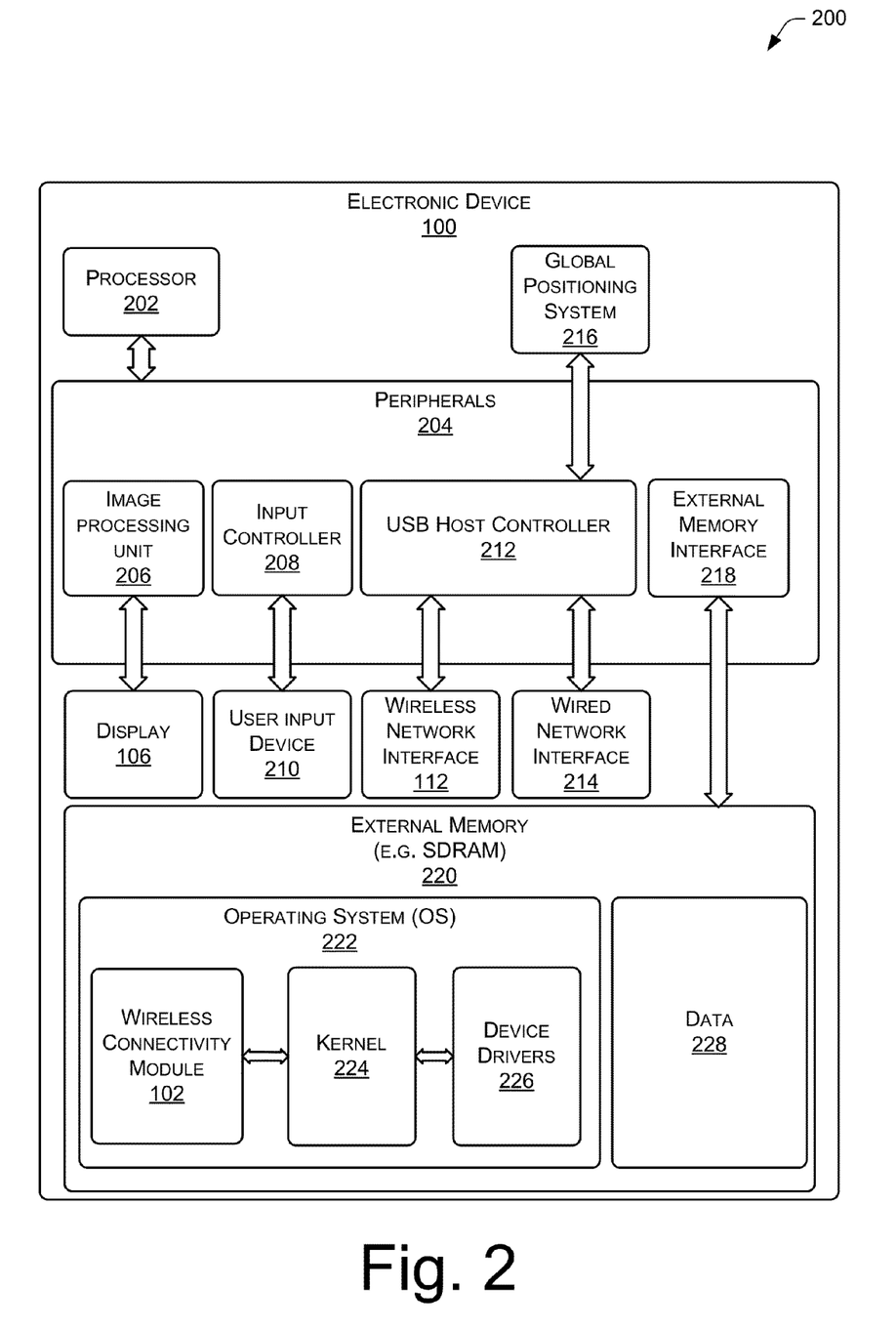
FIG. 2 is an illustrative schematic of an electronic device configured to use the wireless connectivity module.

FIG. 2 illustrates selected functional components 200 that might be implemented in the electronic device 100. In a very basic configuration, the device 100 includes one or more processors 202. Each processor 202 may itself comprise one or more processors.

One or more peripherals 204 may couple to the processor 202. For instance, FIG. 2 illustrates an image processing unit 206 coupled to the display 106. In some implementations, multiple displays may be present and coupled to the image processing unit 206. In some implementations, one or more image processing units 206 may couple to multiple displays.

An input controller 208 may also couple to the processor 202. The input controller 208 may be configured to accept input from a user input device 210, such as a touch screen, mouse, user actuable controls 108, and so forth. In some implementations the user input device 210 may be coupled to a USB host controller 212.

FIG. 2 also illustrates that the electronic device 100 may include the USB host controller 212. The USB host controller 212 manages communications between devices attached to a universal serial bus ("USB") and the processor 202 and other peripherals. The wireless network interface 112 couples to the USB host controller 212 via the universal serial bus. The wireless network interface 112 is configured to provide connectivity to a wireless network, either, local, metropolitan, or wide-area. A wired network interface 214 may also provide connectivity via a physical connection such as an electrical conductor, fiber optic cable, and so forth.

A global positioning system (GPS) device 216 may also be present and coupled to the device via the USB host controller 212 or another interface. The GPS 216 is configured to receive external navigational signals and determine a geolocation. In other implementations, instead of or in addition to the GPS 216, other location determinant devices may be used. Furthermore, these other location determinant devices or services may be external to the device. For example, a WWAN carrier may provide to the device 100 geolocation information of the device 100 based at least in part upon interaction with the carrier's network.

An External Memory Interface ("EMI") 218, which in turn couples to external memory 220, also couples to the processor 202. The EMI 218 manages access to data stored in the external memory 220. The external memory 220 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), or other computer-readable storage media.

The external memory 220 may store any number of functional components that are executable on the processor 202. Thus, the external memory 220 may store an operating system 222 comprising a kernel 224 operatively coupled to one or more device drivers 226. Data 228 including content items such as eBooks may also be stored within the external memory 220. The kernel 224 may also couple to the wireless connectivity module 102, as introduced above with respect to FIG. 1. In some implementations, the wireless connectivity module 102 may be internal to the kernel 224, one or more device drivers 226, or both.

The electronic device 100 may also include other non-illustrated peripheral devices. These other devices may include a Firewire bus, camera, Bluetooth™ wireless interface, PC Card component, hard drive which may use magnetic or optical memory on spinning disks or solid state storage, and so forth.

Couplings, such as that between the kernel 224 and the device drivers 226, are shown for emphasis. There are couplings between many of the components illustrated in FIG. 2, but graphical arrows are omitted for clarity of illustration.

Figure 3:
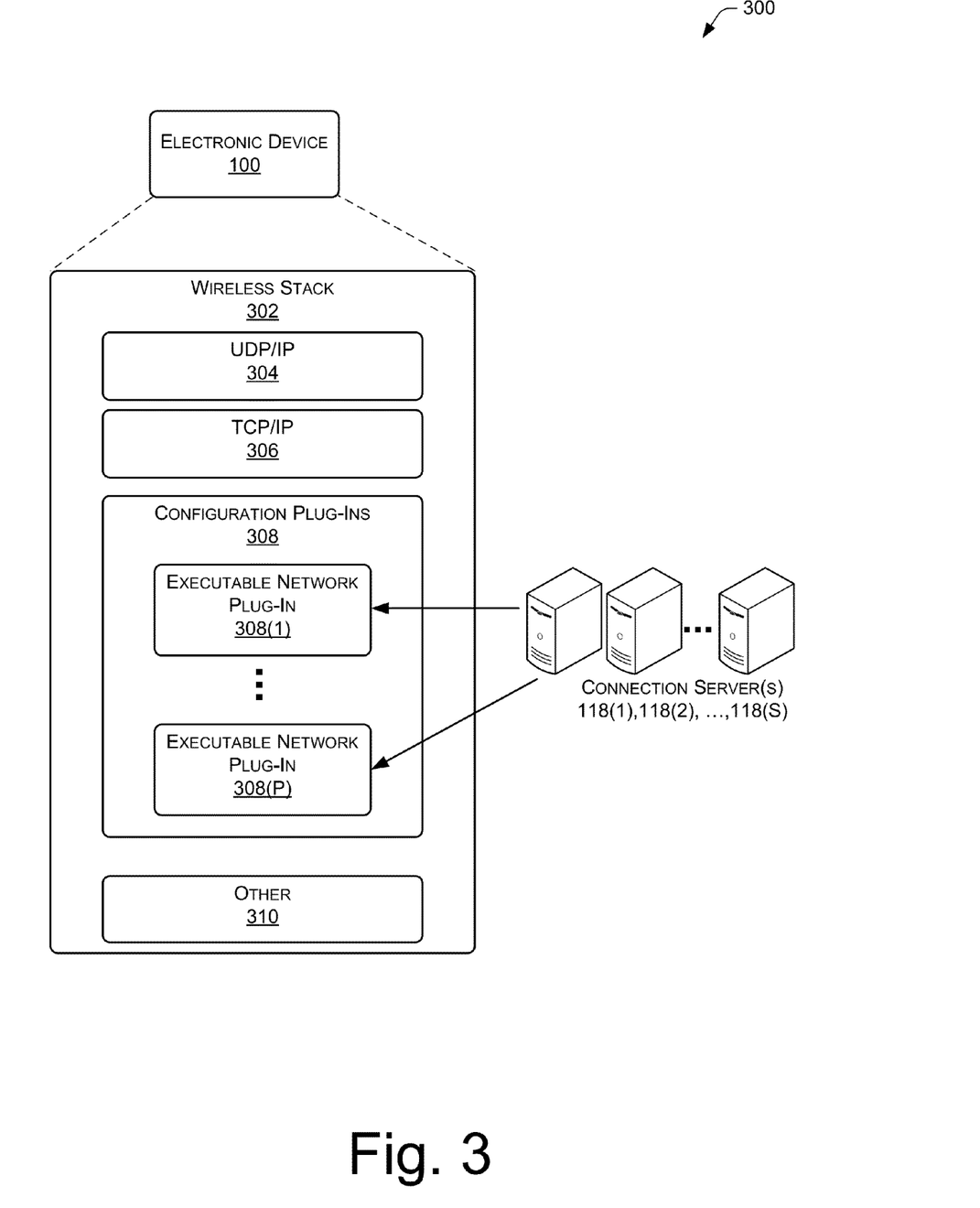
FIG. 3 is an illustration of an example configuration of a wireless protocol stack and a set of network configuration plug-ins used by the wireless connectivity module.

FIG. 3 is an illustration of an example configuration 300 of a wireless stack. The electronic device 100 includes a wireless stack 302 configured to establish and maintain connectivity with resources via the wireless network interface 112. The wireless stack may include a user datagram protocol (UDP) via an internet protocol (IP) component 304. This component generates stateless UDP datagrams, such as may be used for parcels of information sent to the connection servers 118(1)-(S). A UDP datagram does not guarantee reliability, ordering, or integrity of the data. As such, it provides a good lightweight protocol for sending information from the electronic device 100 to the connection servers 118(1)-(S), without burdening the connection servers 118(1)-(S) with the overhead of maintaining transmission control protocol (TCP) connections, as described below.

When a stateful connection is called for, a TCP component 306 may be used. TCP provides, among other features, error correction capabilities at the network interface level, and provides for reliable, ordered delivery of data between devices. As a result, TCP is more resource intensive than UDP in terms of connection setup, maintenance, and teardown.

The wireless stack 302 may also include executable network plug-ins 308(1), 308(2), . . . , 308(P). The executable network plug-ins provide for configuration and connection information and components called for by a wireless service provider (WSP). For example, a WSP may provide internet access on a network named "Bell" to subscribers via WiFi hotspots distributed around the country. To prevent non-subscribers from accessing the network, the ISP may require connection using specific connection and encryption protocols. An executable network plug-in 308 may be configured to allow electronic device 100 to connect via this network. The executable network plug-in 308 may comprise a compiled executable program, a script, virtual machine code, or the like.

The executable network plug-in 308 may also provide other functions which are tailored to the particular network. For example, the network plug-in may be configured to provide special quality-of-service handling for voice-over-IP (VOIP) traffic, provide special geolocation features, and so forth.

The wireless stack 302 may also include other components 310. For example, these components may include simple mail transfer protocol, point-to-point protocol, and so forth.

Illustration of Scanning and Selecting a Network

Figure 4:
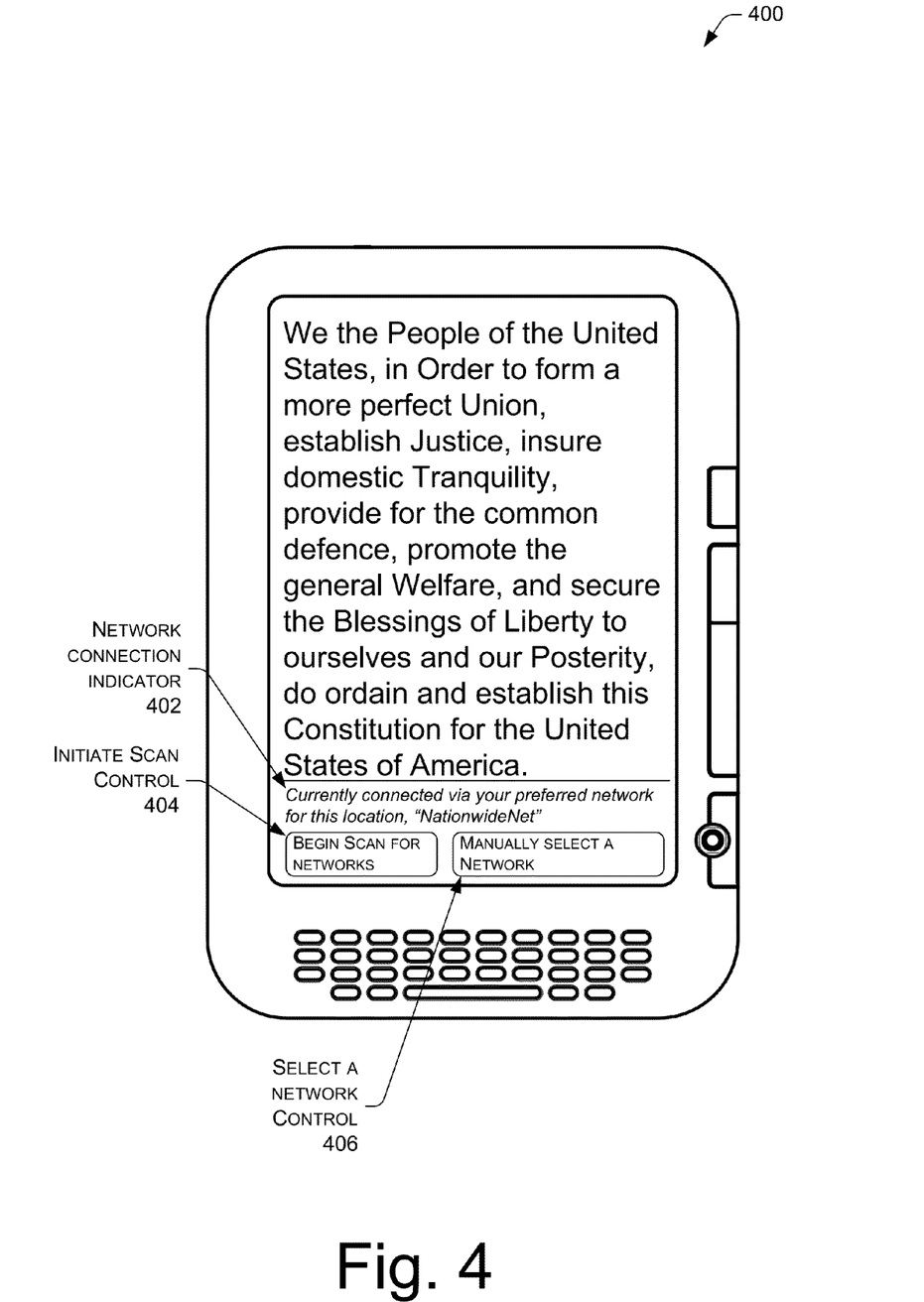
FIG. 4 is an illustrative user interface showing a network connection indicator, a control to initiate a scan for networks, and a control to select a network.

FIG. 4 is an illustrative user interface 400 presented by the display 106 of electronic device 100. In this illustration, a portion of an eBook is presented. By way of illustration, and not as a limitation, the display 106 presents a network connection indicator 402 and several controls. The network connection indicator 402 may comprise text, icon, or a combination and provides information to the user as to current network connectivity available to the device 100. In this example, the network connection indicator 402 indicates the device is connected to a network "NationwideNet" which is a preferred network for the present location.

The controls illustrated here include a control to initiate a scan 404. Upon activation, this control may begin the scanning and connection process described below with regards to FIG. 5. Also shown is a control to select a network 406. This control allows the user to manually select a network from those which have been found. In some implementations, the network connection indicator 402 and controls 404 and 406 either individually or in various permutations may be constantly displayed, displayed after a user requests, or upon a particular event. For example, upon the user initiating an event such as a purchase of an eBook which would result in a transfer of the eBook to the device 100 via the network, the indicator 402 may be presented.

FIGS. 5, 7, 9, and 11 illustrate example processes 500, 700, 900 and 1100 that may be implemented by the architecture described herein or by other architectures. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 5:
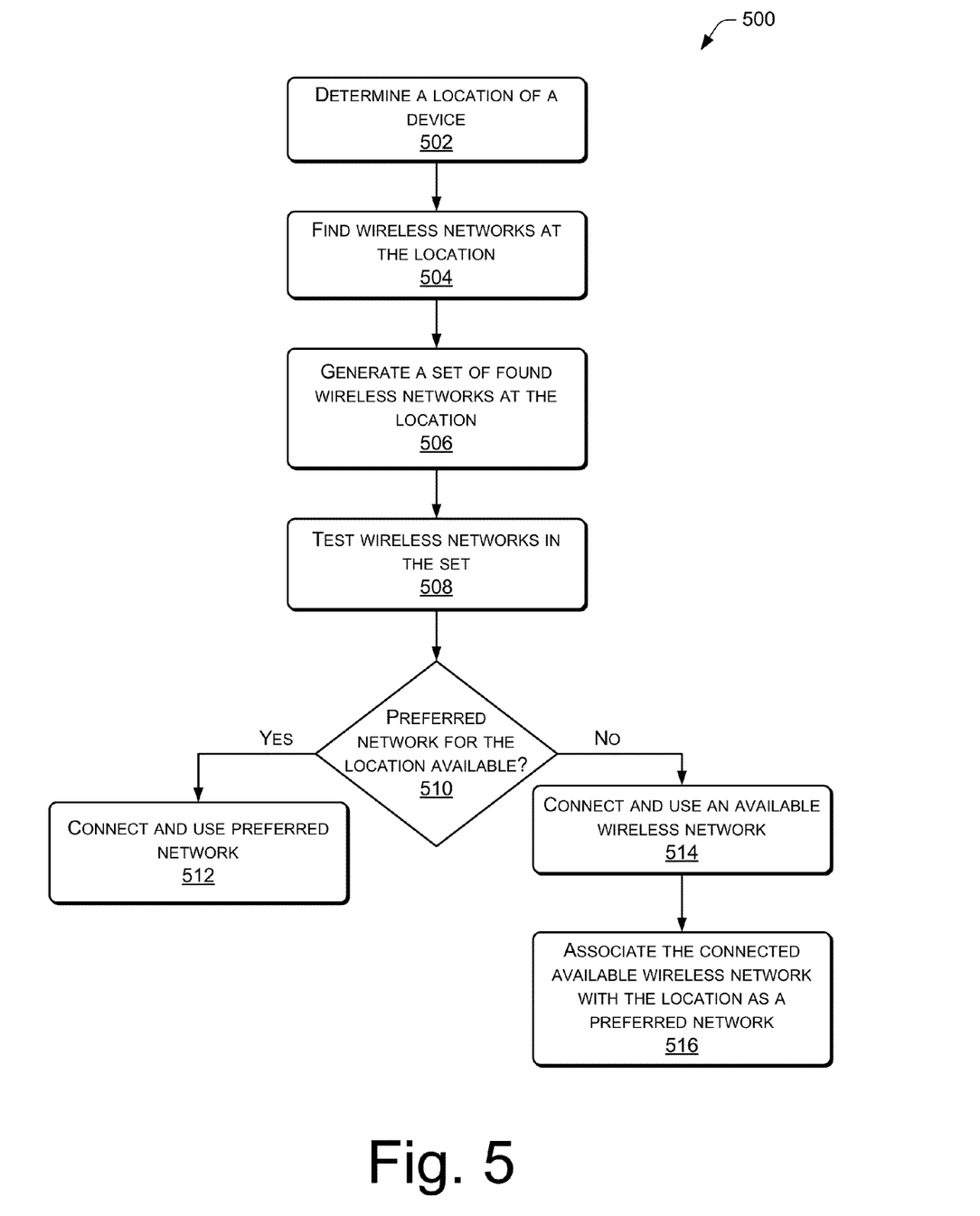
FIG. 5 is an illustrative flow diagram of a process of scanning to provide an efficient wireless connection experience using the wireless connectivity module, which efficiently locates and connects to various wireless networks.

FIG. 5 is an illustrative flow diagram of a process 500 of scanning to provide an efficient wireless connection experience, including finding, testing and connecting to wireless networks. The wireless connectivity module 102 may execute the following process. At 502, the location of the device is determined. This may include interrogating the GPS 216, a WWAN carrier, receiving information from an access point, manual entry by the user, and so forth. This location may be a geolocation such as 49° North and 112° West or a venue such as an airplane or library.

At 504, wireless networks within range of the wireless networking interface 112 are found. These wireless networks may be found by monitoring channels available to one or more radios within the wireless networking interface 112. For example, a WiFi radio may receive a beacon frame from a WiFi network which contains information about the wireless network. In other implementations, wireless data transmissions may be monitored and network information derived therefrom.

Some networks may not broadcast beacons, and may be "quiet," reducing the effectiveness of detection by monitoring. In some implementations, a location of the electronic device 100 may be used to determine wireless networks that should be accessible. Thus, wireless networks may be determined through detection, by comparison with a pre-defined datastore with location information, or a combination thereof.

At 506, a set of the found wireless networks is generated. For example, the set may include a list of individual WLAN, WMAN, WWANs. At 508, at least a portion of the wireless networks in the set are tested. The tests may include determining connectability, performing DNS lookups, retrieving a known reference file, and so forth. The testing is described in more detail below with regards to FIG. 7. As a result of the testing, the wireless networks within the set are categorized as being accessible, open, captive, or unusable. In some implementations, the results of these tests may be stored along with the location to allow for more rapid selection of a particular network, such as a preferred network at the location. Results from the tests as well as data collected during use may also be stored to determine the characteristics of a particular network. For example, testing and usage data over several days may reveal that the "MunicipalWifi" network at the library suffers poor throughput after 5 p.m. local time. As a result, the wireless connectivity module 102 may select another network that is a preferred network for this location generally, a particular time, or the like.

At 510, a determination is made as to whether a preferred network is available for the location. When the preferred network is available for the location, the process proceeds to block 512. The preferred network may be designated by user selection, determined by the wireless connectivity module 102, or previously retrieved from the connection servers 118. At 512, the wireless connectivity module 102 connects to and uses the preferred network.

When the preferred network is not available, the process proceeds to block 514. At 514, the wireless connectivity module 102 connects to and uses an available wireless network. The available wireless network is a network which testing has determined is open, accessible, or captive. At 516, the connected available wireless network may be associated with the location and designated a preferred network. In some implementations, the designation as a preferred network may comprise the favorability characteristics described below with regards to FIG. 11. For example, these characteristics may include reliability, latency, throughput, cost and so forth of the wireless network.

In some implementations, the available wireless network is to be used may vary. For example, it may be preferred to use accessible networks first, then open, then captive. In other implementations the preferences may be altered. For example, to reduce traffic on an accessible network, preference may be made to use open networks, captive networks, then accessible networks. The user, an administrator, or a combination thereof may choose the preferences. These preferences may be distributed across all or a portion of the electronic devices 100 served by the connection servers 118 (1)-(S), or may be individually configured to a particular electronic device 100. Furthermore, the preferences may be dynamically adjusted. For example, a first network may be given preference over a second network when use of the first network would result in lower power consumption.

Figure 6:
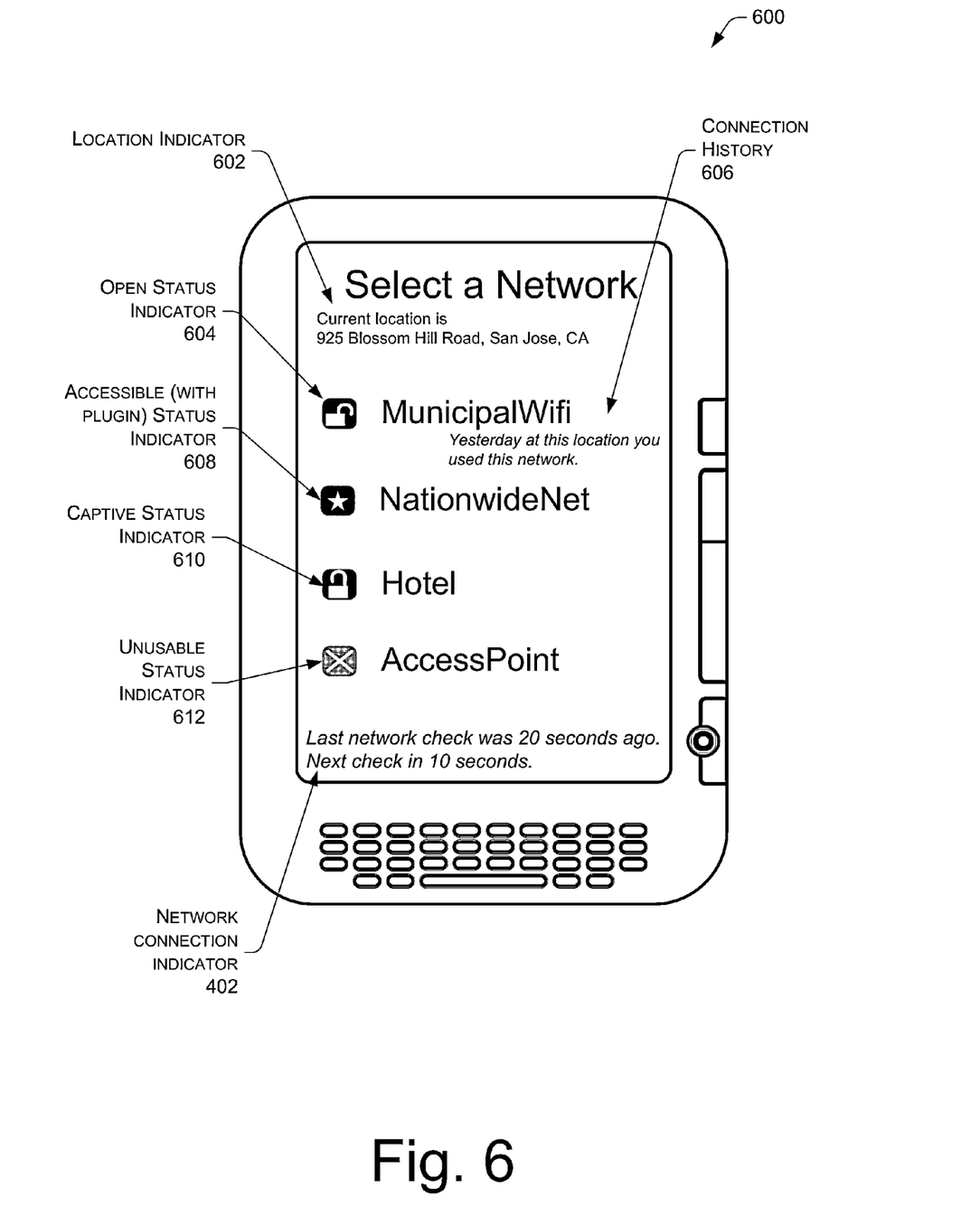
FIG. 6 is an illustrative user interface after the user has activated the control to select a network and depicting several found networks with associated status indicators.

FIG. 6 is an illustrative user interface 600 after the user has activated the control to manually select a network 406. The interface 600 may present a location indicator 602. This location indicator may include text, icons, and so forth. In this example, the location indicator 602 presents text indicating the street address and city of the device 100.

As described below in more detail with regards to FIG. 7, after being found networks may be tested. As shown here, the test results may be used to generate status indicators denoting the availability of each network and information about the networks. Networks may be considered open, accessible, captive, or unusable in some instances. A network is open when no restriction is made on use by undetermined parties. For example, a public WiFi WLAN in a library may represent one example of an open network. An accessible network may comprise a network that is usable with an executable network plug-in 308. For example, an accessible network may be one which is provided by a particular internet service provider upon payment of a monthly fee, or has another restriction to use. A captive network allows connectivity, but requires some additional step such as agreement to terms of service before use. For example, a hotel network may redirect a user upon initial connection to a particular web page containing terms of use which must be agreed to before full access is granted. An unusable network is one which the device is unable to use for communication.

FIG. 6 depicts an example where the device has found networks and illustrates the networks and associated status indicators on a user interface of the device. An open status indicator 604 is shown indicating that a network named "MunicipalWiFi" is open. A connection history 606 may be presented when data about past connectivity with the network is available. For example, as shown here the connection history 606 indicates the device used this network yesterday while at this location.

An accessible status indicator 608 shows that a network named "NationwideNet" is available because the user has an installed plug-in 308 that provides accessibility. Also shown is a captive status indicator 610, showing that a network named "Hotel" is available, but would require an additional step to connect. Also depicted is an unusable status indicator 612 showing a network named "AccessPoint" that is unusable for connectivity. In some implementations, presentation of unusable networks may be suppressed.

As a result of the status indicators, it is thus possible for the user to quickly and easily view the networks which may be of use. In some implementations, initiation of the finding and testing which is used to generate the data which populates this interface may be manual or automatic. For example, the user may manually initiate a scan such as with the initiate scan control 404. In another example, the wireless connectivity module 102 may automatically trigger a scan from an event such as elapsed time since last scan, activation of network-consuming application, and so forth.

Also shown here is the network connection indicator 402. The network connection indicator 402 now reflects that the scanning, which includes finding and testing of networks, recently took place and will reoccur in a short time. In one implementation, the duration of the time interval between scans may be proportional to the time spent within the user interface 600. For example, in some implementations the time interval between scans may increase as the user remains within the screen. In another implementation, the time interval between scans may decrease as the user remains within the screen.

Figure 7:
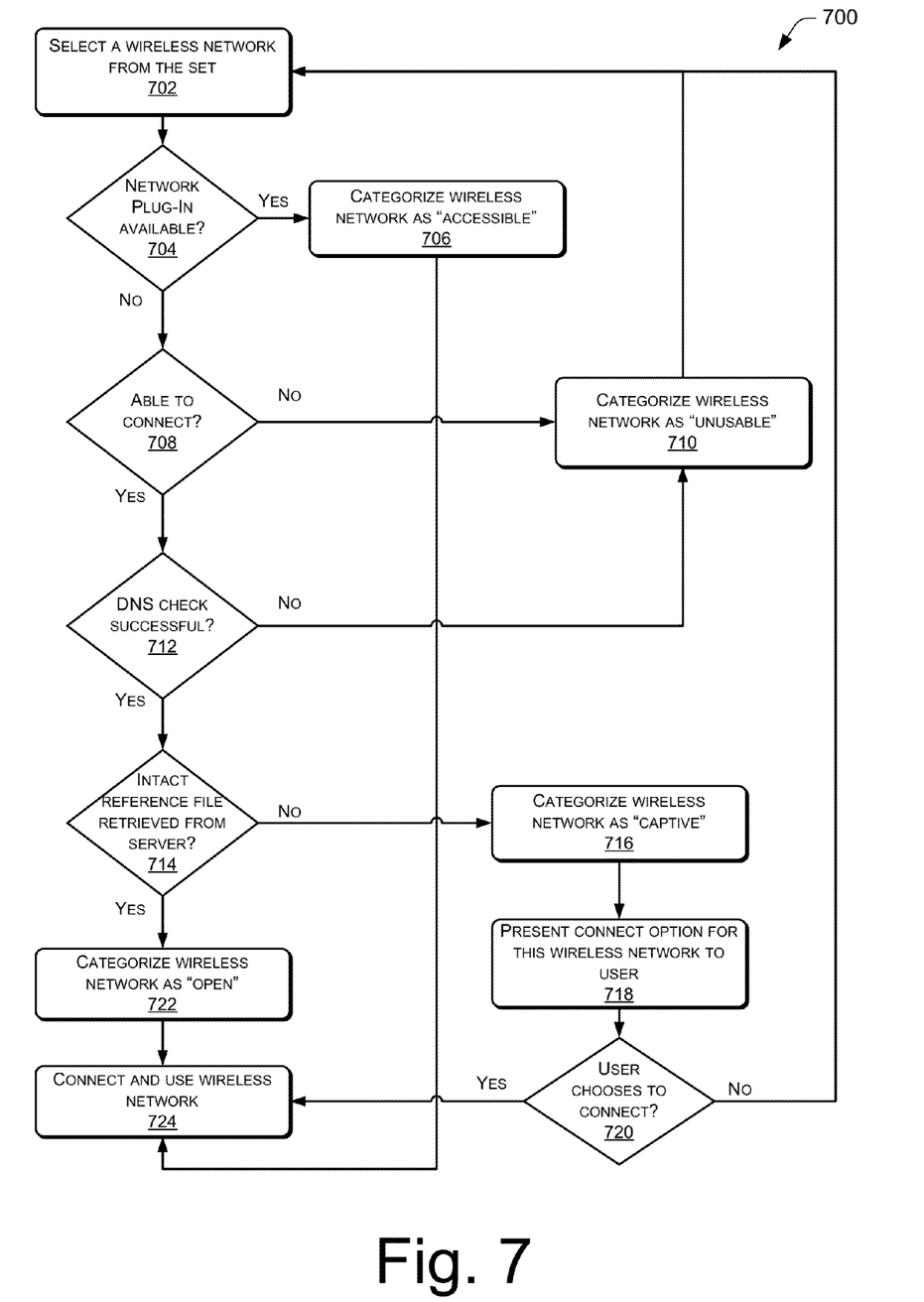
FIG. 7 is an illustrative flow diagram of a process of testing wireless networks that have been located.

FIG. 7 is an illustrative flow diagram of a process 700 of testing wireless networks that have been located. At 702, a wireless network from the set of found wireless networks is selected. At 704, the wireless network is compared with available network plug-ins 308(1)-(P). When, at 704, a network plug-in 308 is available, at 706 the network is categorized as "accessible" and the process may continue at 724 to connect and use the wireless network.

When the network plug-in 308 is not available for the wireless network at 704, the wireless network is then tested for connectability at 708. For example, this test for connectability may include attempting to associate with an access point. When unable to connect at 708, at 710 the wireless network is categorized as "unusable" and returns to block 702 to select another wireless network from the set.

When, at 708, the wireless connectivity module 102 is able to connect, the process proceeds to check a domain name service (DNS) or other network services at 712. For example, a DNS lookup may be requested for a combination of domain name and network address known to the electronic device 100. Upon receiving a response to the DNS lookup that corresponds to that known to the electronic device, the DNS check may be considered successful.

When the DNS check 712 is unsuccessful, at 710 the wireless network is categorized as "unusable." When the DNS check at 712 is successful, at 714 the wireless connectivity module 102 attempts to retrieve intact a reference file, or file with known characteristics, from a server. For example, the reference file may be a file present on the connection servers 118(1)-(S), a portion of the contents of a file such as a web page, and so forth.

When, at 714, the attempt to retrieve the reference file intact fails, at 716 the wireless network is categorized as "captive." The reference file is considered intact when one or more characteristics of the reference file match a pre-determined value or meet a check of internal consistency.

Passage through a proxy server or other network security device may entirely block or modify the reference file. This may occur, for instance, in a hotel where users may freely connect, but receive a hotel-specific page in a web browser upon initial connection. This hotel-specific page may provide terms and conditions of use, prompt for entry of hotel password, and so forth. Regardless of the specific contents, a reference file modified by the hotel's intervening network security devices differs from the reference file expected from the connection server, indicating that the wireless network is altering or otherwise affecting traffic, and is thus captive.

At 718, the wireless connectivity module 102 may then present a connect option to the user for the captive network. This connection may be in the form of a specific user control, presentation of a web page in a browser, and so forth. At 720, the module 102 accepts the user's choice of connection option. When the user does not choose to connect, at 702 the module 102 selects another wireless network from the set. In some implementations this network may also be categorized as "unusuable" or "do not use." In these implementations, the "do not use" category may indicate that the device is avoiding attempting a connection with that network again, for a pre-determined or indefinite amount of time. When, at 720, the module 102 accepts the user's choice to connect to the captive network connection, at 724 connection and use of the wireless network takes place.

Returning to 714, when the reference file is retrieved intact, at 722 the wireless connectivity module 102 categorizes the wireless network as "open." At 724, the module 102 may then connect and use this "open" wireless network.

The process 700 of testing wireless networks may be initiated periodically, at a pre-determined time, upon a pre-determined event, and so forth. Furthermore, categorization of networks may change over time. For example, a WiFi network may be inaccessible until a new network plug-in 308 is obtained from the connectivity service 118.

By finding and testing networks wireless networks at the location, the wireless connectivity module 102 spares the user from the frustration of finding, selecting, configuring, and attempting to connect to wireless networks. As a result, the user experience is much improved.

Figure 8:
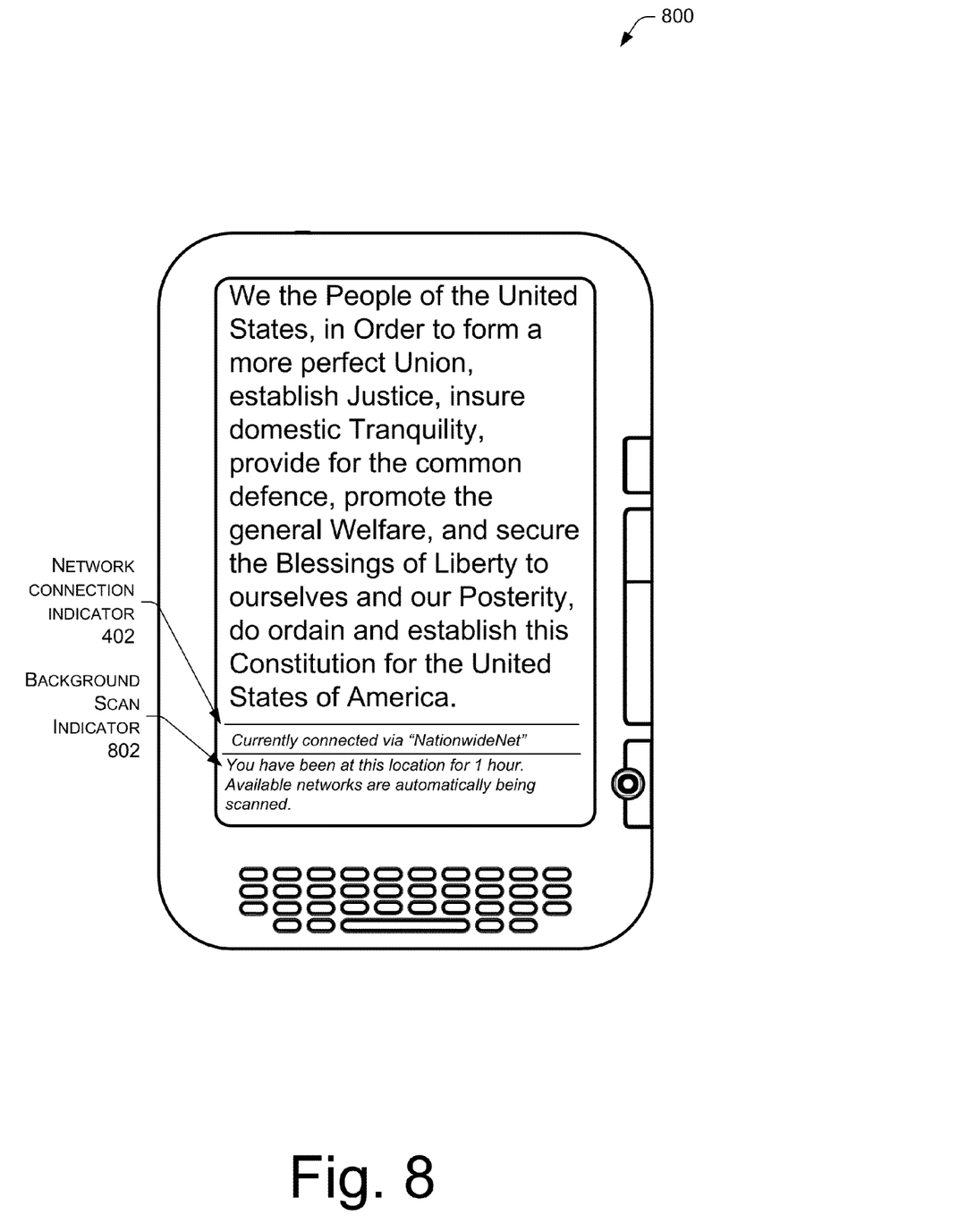
FIG. 8 is an illustrative user interface showing a currently connected wireless network and initiation of an automatic background scan after the device has been in one location for a pre-determined period of time.

FIG. 8 is an illustrative user interface 800 showing a currently connected wireless network and initiation of an automatic background scan. In this illustration, the network connection indicator 402 indicates that the device 100 is currently connected to the "NationwideNet" network. A background scan indicator 802 presents the amount of time at the location and whether a background scan is in progress. In this example, the user has been at this location for one hour, and a background scanning process has been initiated. The background scanning process may be configured to activate after a pre-determined time at the same location has elapsed. This provides for the device 100 to ascertain changes in network availability, and in some implementations, quality.

In some implementations the background scanning process may be configured to initiate upon a loss of connectivity. For example, suppose the device 100 is connected to the "Hotel" network. Due to an equipment malfunction on the "Hotel" network, connectivity via the "Hotel" network is lost and the background scanning process may be initiated to find another network to connect via.

In another implementation, the background scanning process may also be configured to initiate upon a determination that the location has changed. For example, the user may have been reading an eBook at the public library, turned the device 100 off, and returned home. When the device 100 is turned on, it may detect the change in location and initiate a scan for networks without additional user intervention. As a result, burden on the user is minimized.

Figure 9:
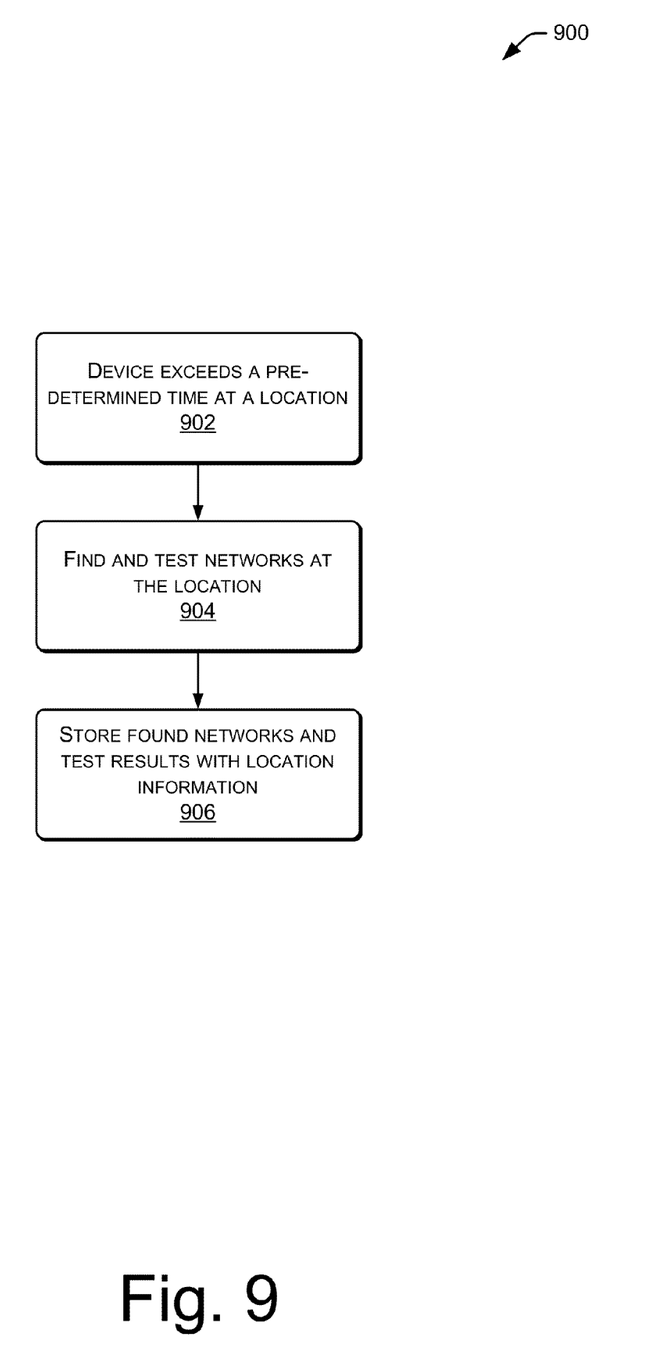
FIG. 9 is an illustrative process of finding and testing networks at a location after the device has exceeded a predetermined time at the location.

FIG. 9 is an illustrative process 900 of finding and testing networks at a location after the device has exceeded a pre-determined time at the location. At 902, the device 100 exceeds a pre-determined time at a location. For example, the device may be configured to scan networks once every hour while at a location to keep the network information current while also minimizing power consumption. Time spent at a location may be determined by comparing clock time with location information.

In some implementations, a timer may be used in conjunction with an accelerometer or other motion sensor within the device 100. In this configuration, the location is deemed to have changed after movements recorded by the accelerometer exceed a pre-determined motion profile. For example, small movements would not indicate a location change, but a significant change in velocity (such as resulting from riding in a car or train) would. As a result, after the conclusion of a train ride, the device 100 may initiate the scan for networks.

In another implementation, the device 100 may suspend scanning during periods of motion exceeding a pre-determined threshold level. For example, the device 100 may suspend scanning during the initial acceleration of the car or train, and initiate scanning once that initial acceleration subsides and the vehicle is at a relatively constant speed.

The device 100 may also be configured to suspend scanning for a pre-determined period of time adjacent to a period of motion exceeding the pre-determined threshold level. Continuing the above example, the device 100 may be configured to initiate scanning three minutes after the initial acceleration subsides.

At 904, the wireless connectivity module 102 finds and tests networks at the location, such as described above with regards to FIG. 5. At 906, the device 100 may store the networks found and the test results along with the location information. This information may also be provided to the connection servers 118. The connection servers 118 may aggregate the data from multiple devices and determine available networks by location.

The connection servers 118 may distribute this aggregated data about locations and available networks to facilitate access by the devices 100. For example, the wireless connectivity module 102 may be configured to avoid testing networks that are known by the connection servers 118 to be unusable or unreliable. By receiving aggregated data associated with the location and avoiding the testing of those unusable networks, power and time is conserved.

Figure 10:
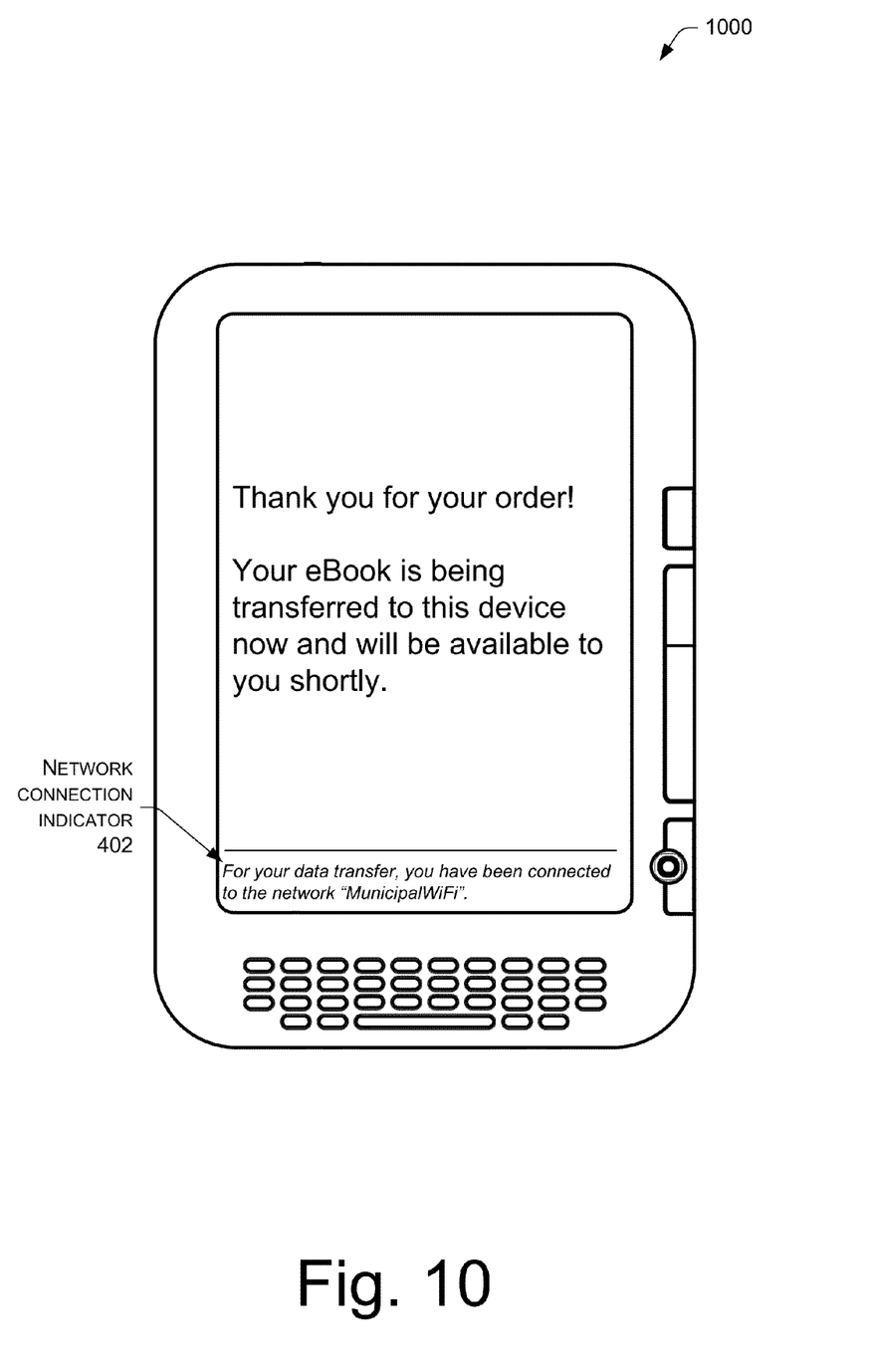
FIG. 10 is an illustrative user interface showing an automatic change in connectivity to a more favorable network.

FIG. 10 is an illustrative user interface 1000 showing an automatic change in connectivity from one network to a more favorable network. As illustrated by FIG. 6, multiple wireless networks may be available at the location for use. Depending upon various favorability characteristics (described below with regards to FIG. 11), some networks may be better suited and thus more favorable for particular tasks. For example, suppose "NationwideNet" is a WWAN network while "MunicpalWifi" is a WLAN. The WWAN is more costly to use, but may be more secure and more favorable to use for transmitting payment information. In contrast, the WLAN network may provide greater throughput and be more favorable for transferring large blocks of data such as a newly purchased eBook.

As shown in this example, the display 106 shows the user has recently purchased an eBook. Suppose this eBook is rather large. To transfer it via the WWAN network would be slower and costlier than transferring via the WLAN network. As a result, the wireless connectivity module 102 has selected the WLAN as the more favorable network for this transfer. This selection is discussed below in more details with regards to FIG. 11. The network connection indicator 402 thus shows that the connection has changed from the WWAN "NationwideNet" to the WLAN "MunicipalWifi." Once the transfer is complete, the device 100 may revert to the previous network, or select a new more favorable network given updated conditions.

Figure 11:
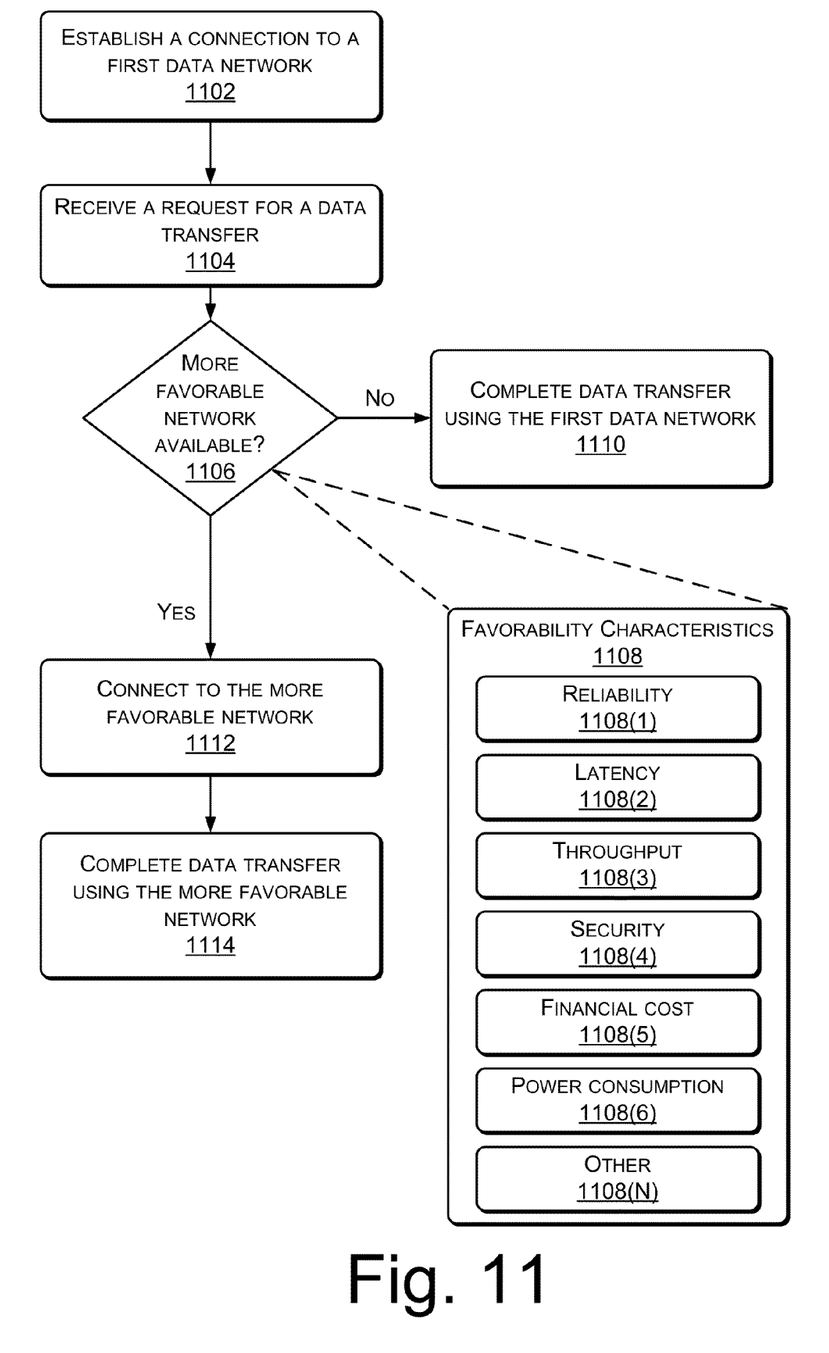
FIG. 11 is an illustrative process of determining and connecting to a more favorable network.

FIG. 11 is an illustrative process 1100 of determining and connecting to a more favorable network. As described above with regards to FIG. 10, various factors may result in one available network being more suitable for use than another. At 1102 a connection is established to a first data network. For example, the wireless connectivity module 102 may be connected to the "NationwideNet."

At 1104, the wireless connectivity module 102 receives a request for a data transfer. This may be for a new data transfer which has yet to be initiated, or a data transfer which has begun on the first data network. For example, as described above with regards to FIG. 10, the user may have purchased an eBook which is to be transferred to the device 100.

When, at 1106, no network is available that is more favorable than the first data network, the device 100 may complete data transfer using the first data network at 1110. However, when a more favorable network is determined to be available at 1106, the process may continue to 1112. At 1112, the wireless connectivity module 102 connects to the more favorable network. This connection may be instead of, or in addition to, the existing connection to the first data network. For example, the device 100 may retain the WWAN connection with "NationwideNet" while the data transfer of the eBook is made using the "MunicipalWifi" network. At 1114, the wireless connection module 102 completes the data transfer using the more favorable network, in this example the "MunicpalWifi."

By way of illustration and not as a limitation, several favorability characteristics are shown here. Reliability 1108(1) of the network to function and deliver traffic may be considered in determining favorability. Latency 1108(2) indicates what kind of delays the network experiences, as well as what kind of delays the application calling for communication can tolerate. Throughput 1108(3) indicates a transfer rate of data through the connection, such as bits/second. Security 1108(4), such as whether encryption is used, strength of encryption, trustworthiness of the network operator, and so forth may be considered. Financial cost 1108(5) such as the dollar cost to transfer bits may be factored in as part of the favorability determination. Power consumption 1108(6) of a given network such as a WWAN radio with high power requirements compared to a lower power WLAN radio may also be used to determine favorability. Other characteristics 1108(N) may be used as well, such as variability in performance of the network, presence of operating agreements between the user and the network operator, and so forth.

When, at 1106, no network is available that is more favorable that the first data network, the device 100 may complete data transfer using the first data network at 1110. However, when a more favorable network is determined to be available at 1106, the process may continue to 1112. At 1112, the wireless connectivity module 102 connects to the more favorable network. This connection may be instead of, or in addition to, the existing connection to the first data network. For example, the device 100 may retain the WWAN connection with "NationwideNet" while the data transfer of the eBook is made using the "MunicipalWifi" network. At 1114, the wireless connection module 102 completes the data transfer using the more favorable network, in this example the "MunicpalWifi."

In other scenarios the favorability may change. For example, if the "MunicipalWifi" network exhibits low reliability 1108(1) and poor latency 1108(2), the "NationwideNet" may instead be chosen as favorable to minimize delays and power consumption due to excessive transmission retries.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A device comprising:
   a memory;
   a wireless network interface;
   one or more processors coupled to the memory and the wireless network interface; and
   a plurality of instructions stored in the memory and executable by the one or more processors to:
   determine a location of the device;
   find one or more wireless networks at the location;

generate a set of the one or more found wireless networks;
test the one or more wireless networks in the set to determine which are available, wherein testing comprises:
when a network plug-in corresponding to a particular wireless network is available, connecting to the particular wireless network using the network plug-in; and
when the network plug-in corresponding to the particular wireless network is not available, performing a secondary test;
when a preferred network is available for the location, connect to the preferred network; and
when no preferred network is available for the location, connect to an available wireless network.

2. The device of claim 1, wherein the location comprises a venue.

3. The device of claim 1, further comprising an electrophoretic display coupled to the processor, wherein the electrophoretic display is configured to present a status indicator for the one or more found wireless networks.

4. The device of claim 1, wherein the plurality of instructions stored in the memory are further executable by the one or more processors to set a pre-determined time interval to scan for networks.

5. The device of claim 4, wherein the plurality of instructions stored in the memory are further executable by the one or more processors to modify the pre-determined time interval proportionate to a time spent presenting test results associated with the testing of the one or more wireless networks in the set.

6. The device of claim 1, wherein the plurality of instructions stored in the memory are further executable by the one or more processors to initiate the determining, finding, generating, and testing when a presence of the device at the location exceeds a pre-determined time threshold.

7. The device of claim 1, wherein the secondary test comprises:
selecting a wireless network from the set;
when an attempt to connect to the selected wireless network fails, categorizing the selected wireless network as unusable and testing a next wireless network from the set;
when the attempt to connect to the selected wireless network succeeds:
when a domain name service check fails, categorizing the selected wireless network as unusable and testing the next wireless network from the set;
when the domain name service check succeeds, attempting to retrieve a reference file from the connection server;
when the reference file is retrieved in an unmodified state, categorizing the selected wireless network as open and connecting and using the selected wireless network;
when the reference file is unretrievable or is retrieved in a modified state, categorizing the selected wireless network as captive and presenting a connect option for the selected wireless network to the user;
when the user declines to connect, testing the next wireless network from the set; and
when the user accepts the connect option, attempting to connect with the selected wireless network.

8. The device of claim 1, embodied as an electronic book reader device.

9. One or more non-transitory computer-readable storage media storing instructions that, when executed by one or more processors of an electronic device, cause the one or more processors to perform acts comprising:
determining a location of the electronic device;
receiving, at the electronic device, a list of networks associated with the location that have been previously identified as unusable or unreliable based on aggregated data received from multiple devices at one or more connection servers;
finding one or more wireless networks at the location;
identifying a set of wireless networks found at the location that are to be tested, wherein a particular wireless network that is included in the list of networks previously identified as unusable or unreliable is excluded from testing;
testing each wireless network of the set of wireless networks to determine an access status of each of the wireless networks; and
connecting to a wireless network of the set of wireless networks based at least in part on the access status.

10. The one or more non-transitory computer-readable storage media of claim 9, further comprising:
determining when a preferred network associated with the location is available; and
connecting to the preferred network when available.

11. The one or more non-transitory computer-readable storage media of claim 9, further comprising:
determining that a more favorable network is present; and
connecting to the more favorable network at least partly in response to the determining that the more favorable network is present.

12. The one or more non-transitory computer-readable storage media of claim 11, wherein the determining that the more favorable network is available comprises assessing one or more favorability characteristics, the favorability characteristics comprising network reliability, network latency, data throughput, network security settings, or financial cost for use.

13. The one or more non-transitory computer-readable storage media of claim 9, wherein the wireless network is accessible when an executable plug-in is available to facilitate connectivity with the wireless network.

14. The one or more non-transitory computer-readable storage media of claim 9, wherein the wireless network is open when access to the wireless network is unrestricted.

15. The one or more non-transitory computer-readable storage media of claim 9, wherein the wireless network is captive when limited connectivity is available and additional interaction is required for access.

16. A method comprising:
under control of one or more processors:
determining a location of a device;
finding one or more wireless networks at the location;
generating a set of the one or more found wireless networks;
testing the one or more wireless networks in the set to determine which are available, wherein testing comprises:
when a network plug-in corresponding to a particular wireless network is available, connecting to the particular wireless network using the network plug-in; and
when the network plug-in corresponding to the particular wireless network is not available, performing a secondary test;
when a preferred network is available for the location, connect to the preferred network; and when no preferred network is available for the location, connect to an available wireless network.

17. The method of claim 16, wherein the network plug-in corresponding to the particular wireless network comprises one or more compiled executable programs, scripts, or virtual machine code.

18. The method of claim 16, further comprising determining whether the data transfer includes transmission of payment information.

19. The method of claim 18, further comprising determining that a wireless wide area network (WWAN) is the preferred network with respect to security when the data transfer includes transmission of payment information.

20. The method of claim 16, further comprising determining whether an amount of data associated with the data transfer exceeds a data throughput threshold.

21. The method of claim 20, further comprising determining that a wireless local area network (WLAN) is the preferred network with respect to throughput when the amount of data associated with the data transfer exceeds the data throughput threshold.

* * * * *